(12) United States Patent
Hansen et al.

(10) Patent No.: US 7,284,477 B2
(45) Date of Patent: Oct. 23, 2007

(54) NEEDLELESS INJECTION DEVICE AND METHOD OF INJECTING

(76) Inventors: Conly L. Hansen, 1310 E. 3100 N., North Logan, UT (US) 84341; Edward D. Watts, 1332 E. 3100 N., North Logan, UT (US) 84341

( * ) Notice: Subject to any disclaimer, the term of this patent is extended or adjusted under 35 U.S.C. 154(b) by 340 days.

(21) Appl. No.: 10/434,408

(22) Filed: May 8, 2003

(65) Prior Publication Data

US 2004/0221746 A1 Nov. 11, 2004

(51) Int. Cl.
*A23B 4/28* (2006.01)
(52) U.S. Cl. .......................... 99/516; 99/534
(58) Field of Classification Search ............... 99/464, 99/516, 532–536
See application file for complete search history.

(56) References Cited

U.S. PATENT DOCUMENTS

| | | | |
|---|---|---|---|
| 3,016,004 A | 1/1962 | Harper, Jr. et al. | |
| 3,246,595 A * | 4/1966 | Wharton et al. | 99/487 |
| 3,436,230 A | 4/1969 | Harper, Jr. et al. | |
| 3,649,299 A | 3/1972 | Sholl | |
| 3,661,072 A | 5/1972 | Allinquant et al. | |
| 3,675,567 A | 7/1972 | Rejsa et al. | |
| 3,734,001 A | 5/1973 | Poster | |
| 3,739,713 A | 6/1973 | Kudale et al. | |
| 3,743,001 A * | 7/1973 | Baxter et al. | 160/105 |
| 3,769,037 A | 10/1973 | Sholl | |
| 3,814,007 A | 6/1974 | Lumby et al. | |
| 3,916,777 A * | 11/1975 | Earl | 99/533 |
| 3,922,357 A | 11/1975 | Townsend | |
| 5,053,237 A | 10/1991 | Hendricks et al. | |
| 5,071,666 A | 12/1991 | Handel et al. | |
| 5,081,917 A * | 1/1992 | Masuda | 99/450.2 |
| 5,176,071 A | 1/1993 | Klaassen | |
| 5,200,223 A | 4/1993 | Simonsen | |
| 5,272,964 A | 12/1993 | Ostergaard | |
| 5,275,095 A | 1/1994 | Van Haren | |
| 5,366,746 A | 11/1994 | Mendenhall | |
| 5,460,842 A | 10/1995 | Morgan | |
| 5,470,597 A | 11/1995 | Mendenhall | |
| 5,472,725 A | 12/1995 | Mendenhall | |
| 5,738,004 A | 4/1998 | Townsend | |
| 5,881,640 A | 3/1999 | Raevsager | |

(Continued)

OTHER PUBLICATIONS

H. J. Lee, N. F. Olson and D. B. Lund, High Pressure Injection of Fluids into Cheese, Process Biocvhemistry, Dec. 1978, pp. 14-18.

*Primary Examiner*—Drew Becker
(74) *Attorney, Agent, or Firm*—Reinhart, Boerner, Van Deuren, S.C.

(57) ABSTRACT

A needleless injection device and method for injecting a food subject is disclosed in which one or more types of liquid food additive are individually and/or simultaneously delivered to a food subject within a sealed injection chamber or compartment. The needleless injection device and method of the present invention utilizes rapid, high pressure injection bursts to completely and uniformly inject the food subject, allowing different food subjects or different food additives to be sequentially injected in an efficient and instant manner. The needleless injection device and method for injecting minimizes contamination by totally enclosing the injection process within a sealed chamber, and by eliminating the need for the injection nozzles to contact, or be placed immediately adjacent to the food subject.

14 Claims, 8 Drawing Sheets

U.S. PATENT DOCUMENTS

| | | |
|---|---|---|
| 5,996,481 A | 12/1999 | Townsend |
| 6,014,926 A | 1/2000 | Tanaka et al. |
| 6,165,528 A | 12/2000 | Tanaka et al. |
| 6,386,099 B1 * | 5/2002 | Otsuka et al. ............... 99/487 |
| 6,439,112 B1 | 8/2002 | Pope |
| 6,497,176 B2 | 12/2002 | Basile et al. |
| 6,658,990 B1 * | 12/2003 | Henning et al. ............. 99/352 |
| 6,763,760 B2 * | 7/2004 | Hansen et al. ............... 99/487 |
| 6,976,421 B2 * | 12/2005 | Hansen et al. ............... 99/487 |
| 2002/0152901 A1 | 10/2002 | Basile et al. |

* cited by examiner

NEEDLELESS INJECTION DEVICE AND METHOD OF INJECTING

BACKGROUND OF THE INVENTION

Field of the Invention

This invention relates generally to devices and methods for injecting foodstuffs, and more particularly to a needleless injecting system and method for needlelessly injecting a food subject with liquid.

As food tastes evolve and consumer palettes become more sophisticated, food producers and restaurateurs are finding new opportunities to experiment with flavors, colors and innovative cuisine. Further, with continuous growth and competition in the food service industry, food producers continuously seek to distinguish their products from others by providing consumers with foodstuffs having unique combinations of ingredients, flavors, colors, and textures.

It is desirable not only to add new flavors or spices to food, but also colorants for intensifying or altering the color of certain foods. Adding color to food products can increase the aesthetic appeal for the food and enhance the natural flavors of the food. In the creation of new and unique food products, changing the color of a particular food can instantly boost the appeal for the food to a particular consumer group. For example, a food producer may increase the desirability of a food among children by producing the food with vibrant or unique colors.

In addition, as scientists identify new and healthy food components, the ability to increase the nutritional content of certain foods while preserving or enhancing the food's flavor is desirable. For example, it may be advantageous for food producers to fortify foods lacking in micro-nutrients such as vitamins or minerals to effectively maintain and improve the overall nutritional quality of the food before it is served. Indeed, in an institutional setting such as a school or a hospital, it may be highly desired to increase the nutritional content their meals.

Further, ingredients such as dietary fiber, protein, omega-3 fatty acids, triglycerides, carotenoids, terpenes, antioxidants, enzymes, fat soluble vitamins, or other nutritionally beneficial ingredients can be added to foods that naturally lack or lose the healthy nutritional ingredients during processing. Moreover, natural colorants derived from fruits, plants or vegetables, such as carotene, add color to a foodstuff while also increasing its nutritional value.

It may also be desirable to supplement food products with other constituents in order to increase the taste or attractiveness of the food to a consumer. Energy enhancing components such as ginseng, or other herbal components such as gingko biloba, may be added to foodstuffs to increase the functional benefits of the food product. Further, preservatives such as sugar, salt, sulfites, or nitrates are commonly added to foods such as meat, to help prevent the growth of bacteria and maintain a food's smell, flavor and appearance.

Therefore, it would be highly desirable for food producers to be able to custom tailor not only the flavor, color, and texture of food products to a consumer's specific needs, but also the nutritional content and overall appeal of the food.

In the field of meat processing, several examples of needleless injection devices exist. In particular, it is a common practice to cure or tenderize meat by adding salts, sugars, spices, and/or preservatives to achieve a certain effect, taste or color.

For example, U.S. Pat. Nos. 3,016,004 and 3,436,230 disclose a device and method for injecting preservative or other curing solution under high pressure into meat in a continuous processing environment. The meat is conveyed by a conveyor system to an injection station and injection nozzles must be moved into position for injection. The injection nozzles are brought into contact with or are positioned immediately adjacent to the meat subject in order to eliminate damage to the meat tissue.

In addition, U.S. Pat. Nos. 5,176,071, 6,014,926, 6,165,528, 6,386,099B1 also disclose large, industrial meat processing devices that convey meat subjects into position and inject the subject using spray nozzles. Each patent teaches spray nozzles in direct contact or spray nozzles oriented immediately adjacent to a meat subject.

U.S. Pat. Nos. 3,739,713 and 3,814,007 disclose a needleless injection device and method for injecting in which a meat subject is secured to a table which is stationary throughout an injection. The injection nozzles of these patents are arranged to ensure contact with the meat subject during an injection.

However, the aforementioned needleless injection machines and injection methods utilize large injection systems geared for use in large-scale meat production/processing facilities and require significant floor space in a plant or manufacturing facility. Many of the aforementioned patents disclose systems that are conveyor driven to move the meat subject into place for injection. In addition, in order to achieve a uniform dispersion of fluid in the meat subject, these machines recite injection nozzles that are adjustable in orientation, and synchronized with movement of the conveyor system if possible.

Importantly, each and every one of these known devices recite methods for injecting meat with brines that require the injection nozzles to touch or contact the surface of the meat or food surface, increasing the chance for bacterial or microbial growth and food contamination.

U.S. Pat. No. 5,053,237 discloses a needleless injection machine for injecting a meat subject that is placed on a stationary platform with brine or tenderizer. The injection nozzles do not contact the injection subject during the injection run; however, the entire injection process including the liquid marinade, water bath, the injection nozzles, and all processing equipment are exposed to the wet operating environment.

Indeed, all of the aforementioned patents disclose injection systems that are totally exposed to the wet working environment, which adds to the potential for contamination of the equipment and/or the meat subject, which increases the likelihood of mechanical failure due to exposure of the process equipment to wet conditions, and which increases the chance for operator injury. Further, all of the aforementioned patents provide systems or methods that are capable of delivering only one tenderizer/solution at a time to a meat subject, which requires the system to be shut down and sanitized before different or additional solutions can be used.

Accordingly, there is needed a device and method for uniquely flavoring or otherwise enhancing the properties of food that minimizes the risk for food or equipment contamination, that is efficient and easy to use in a small operational environment, and that can deliver more than one type of injection solution.

It is accordingly the primary objective of the present invention to provide an efficient and compact needleless injection device capable of rapidly injecting a food subject that is suitable for use in small food production facilities, restaurants, or other institutional food preparation environments. It is a related objective of the present invention to provide an injection device that is easily movable from one operational area to another and easily positioned and installed, further maximizing the types of operational environments in which the device can be used and increasing the overall utility of the device.

It is another objective of the present invention to provide a totally enclosed, needleless injection device in which the mechanical and electrical elements used for operation of the device are completely enclosed within the device, increasing the safety of the device and minimizing exposure of the elements to moist or humid environments, thereby minimizing device maintenance, increasing the useful life of the device, and minimizing the potential for operator injury. It is a related objective of the present invention to provide a totally enclosed injection device that includes an injection environment that is sealed off from the operating environment during an injection run, to minimize exposure of the food subject to external contaminants and to minimize exposure of moving parts to injection spray. It is yet another objective of the present invention to provide a needleless injection device and an injection environment that is easy to clean and sanitize to further minimize the potential for food contamination.

It is yet another objective of the injection device of the present invention to provide injection nozzles that needlelessly inject a foodstuff without contacting the foodstuff, and without requiring the nozzles to be positioned immediately adjacent to the foodstuff, while also delivering a uniform dispersion of injectate within the food subject. It is a related object of the present invention to provide injection nozzles that can be easily removed for cleaning, or easily exchanged, depending on the type of food product to be injected or the pressure required to inject the subject.

It is a further objective of the present invention to provide a needleless injection device capable of injecting more than one type of flavor, color, tenderizer, vitamin, mineral, herbal extract, anti-microbial solution, anti-bacterial solution, or other food additive either alone or simultaneously with other types of liquid injectate during a single injection run. It is a related objective of the present invention to provide a needleless injection device capable of injecting liquid into a wide variety of food stuffs, including but not limited to meat, cheese, fruits, or vegetables. It is a related objective of the present invention to provide a needleless injection device capable retaining injection fluid at its required temperature, reducing the risk of injectate spoilage.

The needless injection device of the present invention must also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. Specifically, the present invention provides a needleless injection device and a method for injecting a food subject with a variety of possible marinades or solutions in an efficient, easy to use, and sanitary manner rendering the device suitable for use in a wide number of applications such as schools, hospitals, hotels, restaurants, and other environments where operational space may be limited. The present invention is also highly advantageous over conventional systems and methods because it provides a compact, high-pressure injection system for quickly and easily flavoring or otherwise uniquely enhancing a food subject in a sealed injection environment, without damaging the food subject, and without requiring nozzle contact with the food subject, thereby minimizing the potential for food/equipment contamination and maximizing the utility of the invention.

The injection device and method of the present invention are used to needlelessly inject a food subject with any type of liquid food additive, including but not limited to food additives such as flavors, colors, tenderizers, marinades, vitamins, minerals, herbal extracts, preservatives, fats/oils, water, anti-microbial solutions, anti-bacterial solutions, or combinations thereof. In addition, the needleless injection device and method of the present invention can be used to inject any type of foodstuff, including but not limited to meats, cheeses and other dairy products, fruits, vegetables, or grain products.

Accordingly, the injection device of the present invention generally includes an injectate delivery system, an injection chamber, a shuttle mechanism, and a control system configured within a sealed enclosure. External process inputs, such as electrical power, water, and optionally, compressed air are removably connected to the device via input ports formed within a surface of the enclosure.

The injectate delivery system of the device includes at least one removable container for holding liquid injectate. Preferably, several containers are used for storing a variety of different types of liquid injectate. Each container is removably mounted within the device and each is removably connected to its own supply valve, allowing each container of injectate to be delivered to a food subject either individually or simultaneously during a single injection run. Water is also supplied to the injection delivery system, for diluting the liquid injectate, where required, or for cleaning and rinsing the device. The injectate delivery system also includes a refrigeration system to maintain the injectate containers, and water supply at the required temperature to reduce the risk of injectate spoilage.

The injectate delivery system also includes a pump capable of delivering liquid injectate a food subject at a sufficiently high pressure to needlelessly and uniformly inject the subject with injectate without damaging the food subject. The output pressure of the pump varies depending on the size and thickness of the subject, and type of subject to be injected. An injection head, also part of the injection delivery system, receives the high-pressure injectate from the pump.

The injection head contains a plurality of spray nozzles for delivering the high-pressure injectate to the subject, and is sealably and removably mounted within the injection chamber with the nozzle portion of the injection head extending inside the injection chamber. For versatility and cleaning purposes, the nozzles of the injection head are, preferably, removably secured within the injection head; however, the injection nozzles may be integrally formed within the injection head. The nozzles may be arranged in any pattern or configuration known to those skilled in the art and may be reconfigured for different types of food subjects. The injection head may also contain a filter element for removing unwanted particulate from the liquid injectate.

The injection chamber generally includes a sealed compartment formed within the device that includes a portion of the injection head, or the nozzle section of the injection head, sealably and removably mounted within the chamber, and extending down from the top of the chamber. The injection chamber includes an opening within its bottom for draining excess injectate from the device. The injection chamber also includes cleaning nozzles which are sealably mounted within the chamber for sanitizing and rinsing the injection chamber between injection runs. The injection environment is sealed closed during an injection run, or during a cleaning cycle, preventing injectate spray from contacting any external process equipment, or food subjects outside the injection environment.

The shuttle mechanism includes an x-y drive system located exterior to and underneath the bottom surface of the injection chamber, and a shuttle/tray component located within the injection chamber which moves the food subject with respect to the injection head during an injection run. The x-y drive system includes a plate which can be moved to any position underneath the injection chamber. The top of the plate faces the bottom, external surface of the injection chamber and includes a plurality of magnets affixed thereto.

The shuttle/tray component is movably located inside the injection chamber, and contains a top surface which faces the injection nozzles, and a bottom surface which faces the bottom, internal surface of the injection chamber. The bottom surface of the shuttle/tray component contains a plurality of magnets which are aligned with the magnets in the plate. Accordingly, the x-y drive system will move the plate, which in turn moves the shuttle/tray component to any position within the injection chamber, without the need for moving components located within the injection chamber.

The control system includes a touch screen and a programmable controller for entering, storing, and recalling process variables and operational information including but not limited to the size or types of injection subject; the number of injection bursts delivered to a given subject for a given injection run; the timing of the injection bursts; the duration of the injection bursts; the movement of the shuttle mechanism; the synchronization of the injection bursts with the movement of the food subject; the output pressure of the pump, the outlet pressure of the injection bursts; the composition of the injectate delivered to the subject; or the cleaning and rinsing cycles. For example, the device may be programmed for a specific food, a specific food thickness, or a specific marinade blend, and later recalled when the same food or marinade blend is again injected. The control system also controls the refrigeration system.

The present invention also teaches a method for injecting a food subject with liquid injectate which includes placing the food subject on a shuttle/tray component within a sealed injection environment; providing a plurality of injectate fluids to be injected; mixing said fluids in proportion to achieve the desired injectate composition; drawing the desired injectate composition into a high-pressure pump; supplying the injectate composition to an injection head; and delivering at least one high-pressure injection burst of the final injectate composition to the food subject. The method of the present invention can also include moving the injection subject with respect to the injection head in a preprogrammed pattern during an injection burst, depending on the desired injection results.

In part, the present invention can also include a method for uniquely flavoring or otherwise enhancing a food subject. Such a method comprises (1) providing a food subject to be injected; (2) determining a desired final injectate composition for the food subject; (3) mixing said final injectate composition and supplying said composition to at least one high-pressure pump; and (4) delivering at least one high pressure burst of the desired injectate composition to the food subject.

It may therefore be seen that the present invention teaches a needleless injection device and method for injecting a food subject that utilizes high-pressure injection bursts of a desired injectate composition to uniquely enhance a food product. The device and method of the present invention injects a food subject in a compact, and efficient manner, while also minimizing food or contamination, for example, by providing a sealed injection environment and spray nozzles that do not contact the food subject.

The needleless injection device and method of the present invention are of a construction which is both durable and long lasting, and which will require little or no maintenance to be provided by the user throughout its operating lifetime. The needleless injection device and method of the present invention are also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 4 is a cross-sectional view of a pouch for containing injectate and a tray of the injection device shown in FIG. 3 taken along line 4-4;

DETAILED DESCRIPTION OF THE PREFERRED EMBODIMENT

The preferred embodiment of the present invention involves a totally enclosed, needleless injection device and method for injecting a food subject with flavors, colors, tenderizers, marinades, vitamins, minerals, herbal extracts, preservatives, fats/oils, water, anti-microbial solutions, antibacterial solutions, or any other food additive known to those skilled in the art.

Figure 1:
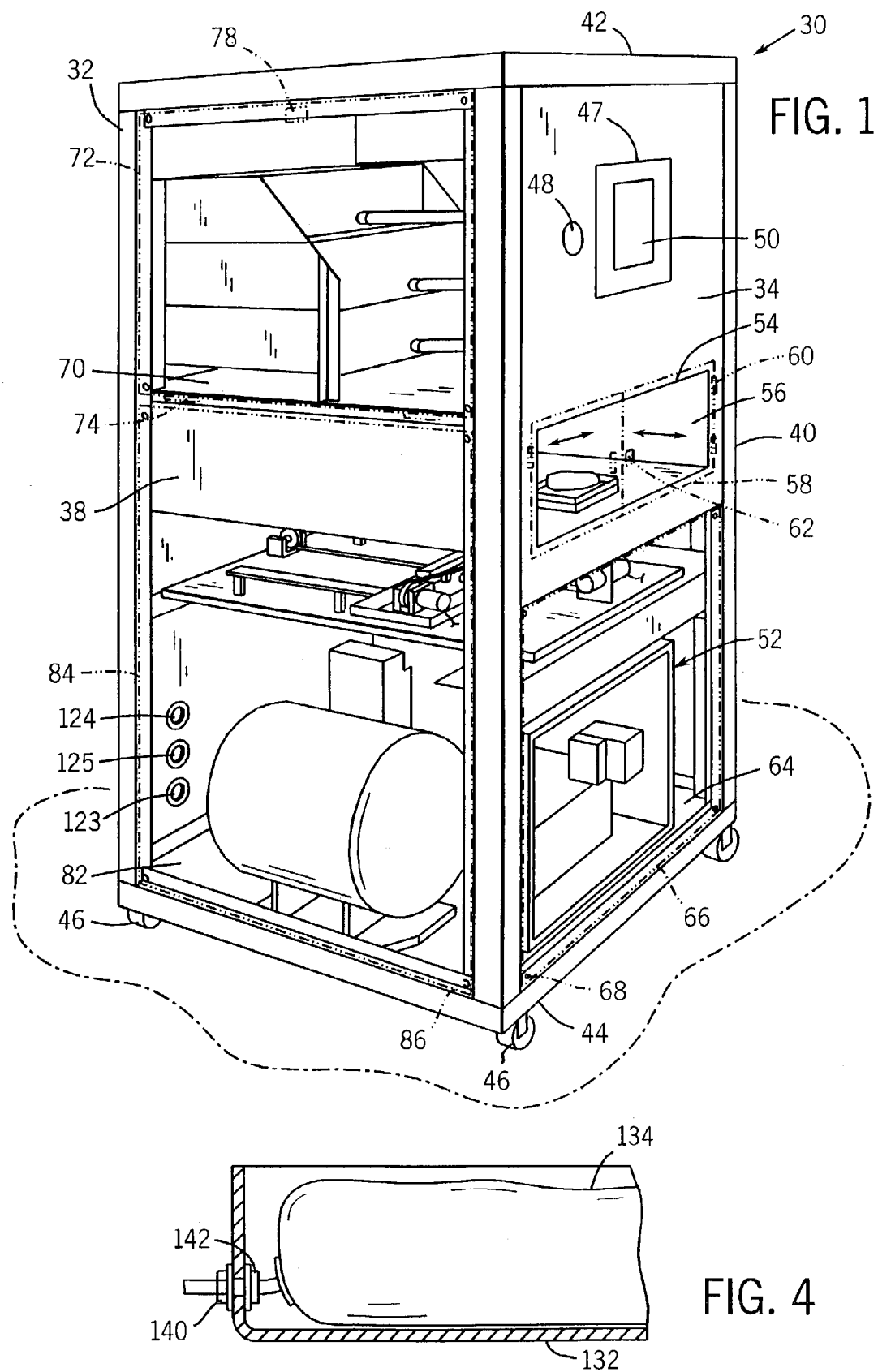
FIG. 1 is an isometric view of the injection device of the present invention showing a front and a left side thereof, with doors shown in phantom for illustrative purposes.

Referring first to FIG. 1, a needleless injection device 30 of the present invention is illustrated. The device 30 includes a generally rectangular housing defined by a frame 32 and having a front side 34, a back side 36, a left side 38, and a right side 40. The device 30 has a top 42 and a bottom 44 mounted to the frame 32 to completely enclose the top and bottom of the device 30, respectively. The top 42 may be removably mounted to the frame 32 in order to provide maintenance access to the device 30. The device 30 is supported by four casters 46 for easily moving the device 30 into place for an injection run.

The front side 34 of the device 30 contains a control panel 47 which includes a button or switch 48 for powering the device 30 on and off. A touch screen 50, also part of the control panel 47, is used to enter process parameters, to recall a saved program from a controller 52, to initiate a cleaning cycle, or to view operational information. The front side 34 of the device 30 also contains an opening 54 for an injection chamber 56, and contains doors 58 for sealing closed the opening 54. Hinges 60 secure the doors 58 to the front side 34 of the device 30 and permit the doors 58 to open completely. A locking mechanism 62 seals the doors 58 closed during operation of the device 30. The doors 58 may be mounted in any manner known to those skilled in the art that seals the injection chamber 56 when the doors are closed during an injection run.

Also illustrated in FIG. 1, the front side 34 of the device 30 includes a maintenance opening 64 near the bottom 44 of the device 30. A maintenance door 66 (shown in phantom for illustrative purposes) is provided for closing and sealing the maintenance opening 64. The maintenance door 66 is flush with the external surface of the frame 32. The maintenance door 66 is removably mounted to the front side 34 of the device 30 with machine screws 68. The maintenance door 66 may be removably mounted in any manner known to those skilled in the art that seals the maintenance opening 64 and that permits easy access to the internal components of the device 30.

Figure 2:
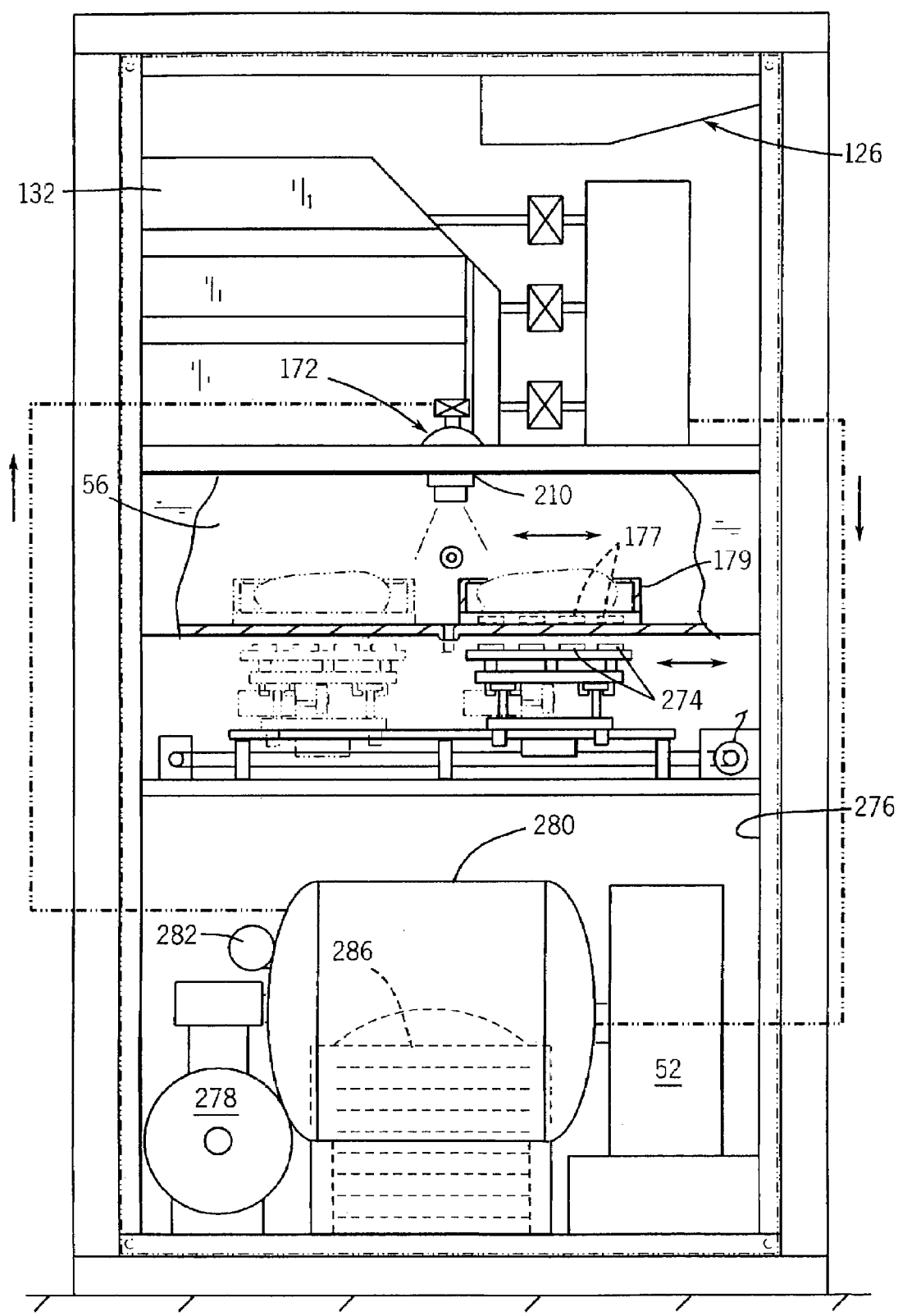
FIG. 2 is left elevation view of the injection device shown in FIG. 1, with x-y drive mechanism shown exposed.

As illustrated in both FIGS. 1 and 2, the left side 38 of the device 30, contains an access opening 70 formed near the top 42 of the left side 38 of the device 30. The opening 70 is closed and sealed by an access door 72 movably mounted to the left side 38 of the device 30 (shown in phantom in FIG. 1 for illustrative purposes). Hinges 74 on a bottom edge of the access door 72 secure the access door 72 to the left side 38 of the device 30 and permit the access door 72 to open completely. The access door 72 also contains a locking mechanism 78 near a top edge of the access door 72 to secure the access door 72 in a closed position. When closed, the access door 72 is flush with the external surface of the frame 32. The access door 72 may be movably or removably mounted in any manner known to those skilled in the art that permits easy access to the internal components of the device 30 and closes and seals the opening 70 during an injection run.

The left side 38 of the device 30 includes a maintenance opening 82 near the bottom 44 of the device 30. A maintenance door 84 (shown in phantom for illustrative purposes) is provided for closing and sealing the maintenance opening 82. The maintenance door 84 is flush with the external surface of the frame 32. The maintenance door 84 is removably mounted to the left side 38 of the device 30 with machine screws 86. However, the maintenance door 84 may be removably mounted in any manner known to those skilled in the art that closes and seals the maintenance opening 82 during operation and that permits easy access to the internal components of the device 30.

In a symmetrical fashion to the left side 38, both the right side 40 and the back side 36 contain an access opening (not shown), such as access opening 70 in the left side 38. Likewise, both the right side 40 and the back side 36 include an access door (not shown) similar to the access door 72 in the left side 38 which is movably mounted to the right side 40 and the back side 36 of the device 30, respectively. Hinges on a bottom edge of each access door secures the access door to the right side 40 or the back side 36 of the device 30, respectively, and permit the access door to open completely in a manner similar to the left side 38. The right side 40 and back side 36 access doors also contain a locking mechanism near a top edge of the access door to secure the access door in a closed position. When closed, each access door is flush with the external surface of the frame 32 in a manner similar to the left side 38.

Likewise, both the right side 40 and the back side 36 include a maintenance opening near the bottom 44 of the device 30, similar to the maintenance opening 82 in the left side 38 of the device 30. Symmetrical with the left side 38, both the right side 40 and the back side 36 include a maintenance door (not shown), similar to maintenance door 84 in the left side 38, for closing and sealing each maintenance opening, respectively. Each maintenance door located on the right side 40 and the back side 36 of the device 30 is flush with the external surface of the frame 32 in a manner similar to that of the left side 38. Each maintenance door is removably mounted to the right side 40 or the back side 36 of the device 30, respectively, with machine screws (not shown) in a manner similar to the left side 38.

Referring back to FIG. 1 for the moment, it can be seen that the back side 36 of the device 30 includes a water input port 123 and an electrical input port 125. In alternate embodiments, the back side 36 of the device 30 will also include a connection for compressed air which is externally supplied to the device 30 where no internal compressed air source is supplied. The back side 36 of the device also includes a drain port 124 through which excess liquid injectate, rinse water and/or spent cleaning solution can exit the device 30. The water input port 123, the electrical input port 125, and the drain port 124 are adapted to be connected to external hoses, piping, or connections by any means known to those skilled in the art.

Figure 3:
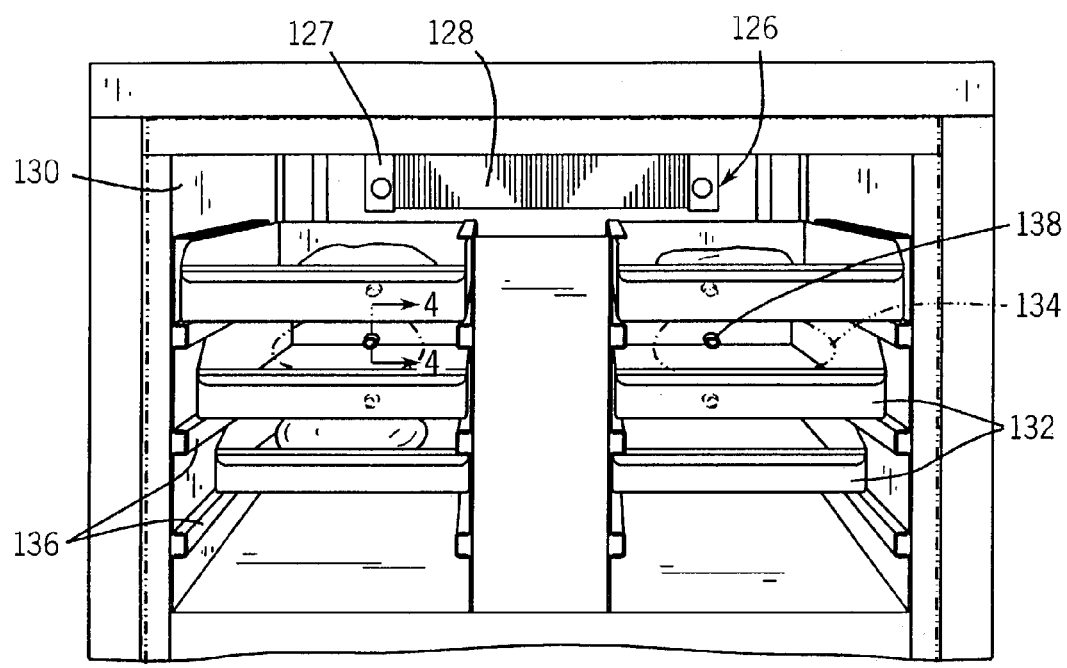
FIG. 3 an elevation view of the injection device shown in FIGS. 1 and 2, showing a partial view of the back side thereof.

Referring to FIGS. 2 and 3, an air conditioning system 126 including a condenser 127 and a fan assembly 128 is mounted within a top portion 130 of the device 30. The air conditioning system 126 ensures the liquid injectate is at the proper temperature for injection. In particular, without refrigeration, the liquid injectate may spoil or be of a temperature that fosters microbial or bacterial growth once injected into a food subject.

Also referring to FIGS. 2 and 3, the top portion 130 of the device 30 houses six injectate trays 132 for retaining six injectate pouches 134 filled with liquid injectate. The pouches 134 are preferably one gallon in size, but can be of any volume. The pouches 134 hold any type of liquid food additive known to those skilled in the art including but not limited to flavors, colors, vitamins, minerals, salts, sugars, preservatives, tenderizers, marinades, herbal extracts, antibacterial solutions, anti-microbial solutions, or medicines. In addition, the pouches 134 can contain water for dilution of concentrated food additives. The pouches 134 can be constructed of any material approved for food packaging including but not limited to glass, stainless steel, or food grade plastics. Optionally, the pouches 134 can be sanitizable and reusable to cut down on waste.

The trays 132 are positioned on support brackets 136 which permit the trays 132 to slide in and out of the device 30 for easy change-out of the injectate pouches 134. Each tray 132 contains an opening 138 which is in fluid communication with an outlet of the injectate pouch 134 and through which injectate fluid will exit the injectate pouch 134 during operation of the device 30, as will be described. The trays 132 are angled slightly downward towards the front side 34 of the device 30 to permit proper flow of liquid injectate out of the injectate pouches 134. Although six trays 132 and six pouches 134 are illustrated, it will be appreciated by those skilled in the art that the device 30 may contain any number of trays 132 and pouches 134, depending on the particular application for the device. For example, a hospital may require many more than six trays 132 and pouches 134, while a restaurant may only require four trays 132 and pouches 134.

FIG. 4 illustrates a detailed view of how the injectate pouches 134 connect with the trays 132. Attached to the opening 138 in the tray 132 is a quick-connect fitting 140. The pouch 134 includes a fitting 142 designed to sealably mate with the quick-connect fitting 140 in the tray 132. Alternatively, the liquid injectate can be provided in any container known to those skilled in the art which contains a fitting designed to sealably mate with the quick-connect fitting 140 in the tray 132.

In addition, the trays 132 may alternatively be supported within the top portion 130 of the device 30 by any means known to those skilled in the art. For example, instead of support brackets 136, the trays can be supported by means of a tongue and groove arrangement, or simply with support pegs.

Further, it will at once be appreciated to those skilled in the art that liquid injectate can be supplied to the device in any manner known in the art. For example, liquid injectate can be externally supplied to the device 30 using a piping mechanism or another sanitary fluid connection that feeds liquid injectate directly into the top portion 130 of the device 30. Alternatively, any container arrangement capable of retaining the liquid injectate and housed within the top portion 130 of the device 30 can be used to supply injectate for an injection run.

Figure 5:
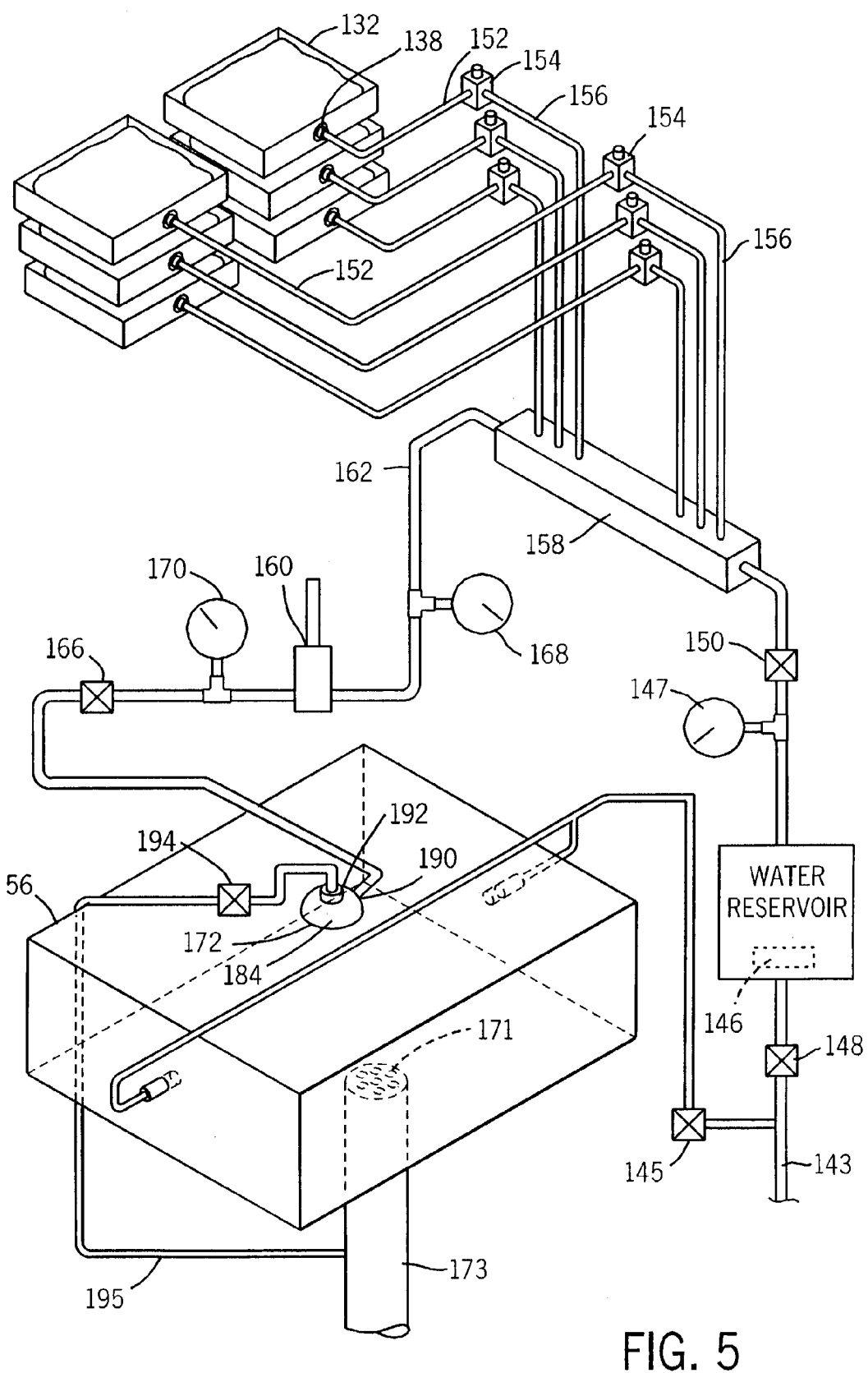
FIG. 5 is a fluid schematic of the injection device shown in FIGS. 1 through 4.

Turning next to FIG. 5, a fluid schematic is shown. A water line 143 is in fluid communication with the source of water via the water input port 123. The water line 143 supplies water to a water reservoir 144 and is also connected to a cleaning valve 145 which diverts water necessary for cleaning the injection chamber 56 to cleaning nozzles 174 (shown in FIG. 6).

The water reservoir 144 is mounted within the top portion 130 of the device 30 in order to provide water for dilution of the liquid injectate, if required, or to rinse the injection system in between injection runs. A level sensor 146 provides an output to the controller 52 indicating the level of water within the water reservoir 144. A water replenishment valve 148, located at the inlet to the water reservoir 144, permits automatic replenishment of the water reservoir 144 from the water line 143 when the level in the water reservoir 144 drops below a predetermined volumetric value as indicated by the level sensor 146.

A temperature sensor 147 provides an output to the controller 52 indicating the temperature of water within the water reservoir 144. If the temperature sensor 147 indicates that the water in the water reservoir 144 is above a required operational temperature, the controller 52 prevents an injection run from being initiated until the temperature drops below the required operational temperature.

A water control valve 150 is located at the outlet of the water reservoir 144 for controlling water flow out of the water reservoir 144. In other embodiments, the water line 143 may be connected directly to the water control valve 150 to control the flow of water in the device 30, eliminating the need for a water reservoir 144. In yet another embodiment, a larger reservoir can be used when a water line 143 is not available, and the large reservoir must then be a manually replenished.

Also shown in FIG. 5, injectate transfer lines 152 are attached to each of the openings 138 in the trays 132. Each transfer line 152 is connected to a valve 154 for controlling the flow of liquid injectate from each individual injectate pouch 134. Each valve 154 can be independently actuated, or simultaneously actuated with one or more of the other valves 154, or with the water control valve 150, depending on the desired injection effect.

Lines 156 direct flow of the injectate exiting the valves 154 to a mixing manifold 158. Depending of the desired injection effect, the mixing manifold 158 receives injectate from one or all of the injectate pouches 134 and/or water from the water reservoir 144. The mixing manifold 158 may be constructed of any material known to those skilled in the art that is approved for food processing or production. The mixing manifold 158 may be of any size or shape.

A high pressure pump 160, mounted within the top portion 130 of the device 30, draws the injectate from the mixing manifold 158 via a pump feed line 162. The pressure of the injectate exiting the pump 160 can range from approximately 500 psi to approximately 3000 psi, depending on the type of food subject to be injected. Preferably, the pressure of the injectate at the outlet of the pump 160 ranges from approximately 1000 to approximately 1800 psi. However, it is consistent with the broader aspects of the invention that the pressure at the outlet of the pump can be any pressure required to achieve the desired injection effect on the food subject. Preferably, the pump 160 is an air pump, however, any pump known to those skilled in the art capable of delivering injectate at a sufficient pressure to needlelessly inject a food subject may be used.

Figure 10:
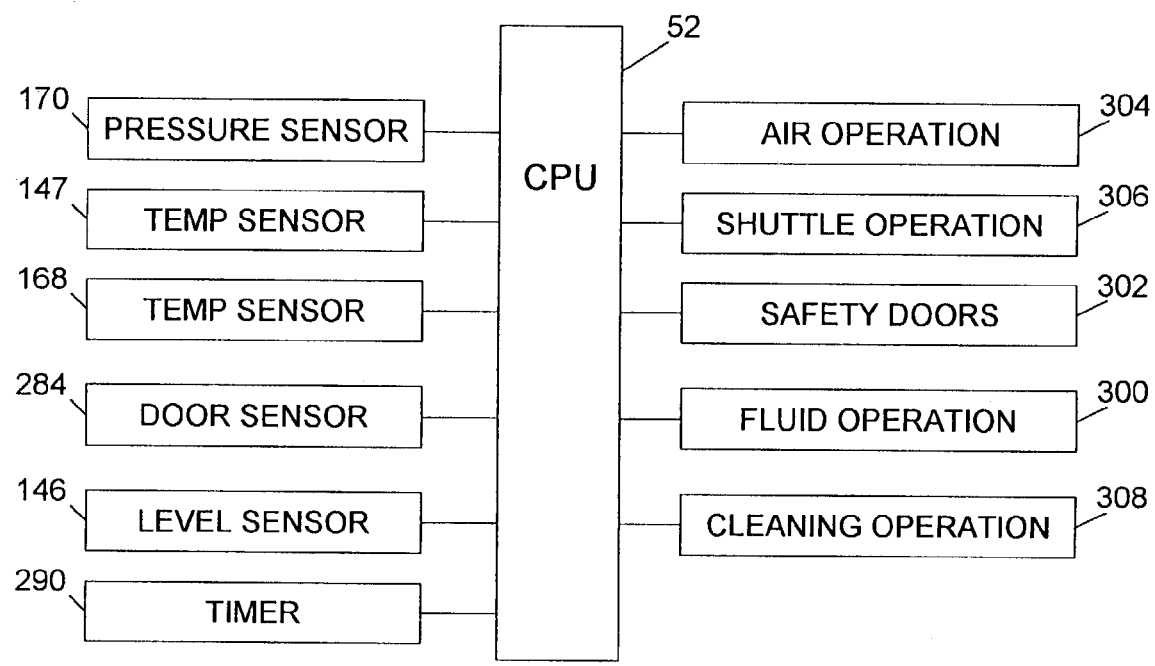
FIG. 10 is a control schematic of the injection device shown in FIGS. 1 through 8, showing automatic control of an air operation of the device.

A pressure sensor 170 is located at the exit of the pump 160 and located within the top portion 130 of the device 30. The pressure sensor 170 detects the outlet pressure of the liquid injectate and provides a pressure output to the controller 52. The controller 52 is programmed to respond to the pressure output by adjusting the flow of compressed air to the pump 160 using an air pressure regulator 282 (shown in FIG. 2), thereby adjusting the output pressure of the liquid injectate to the preprogrammed or predetermined pressure for injection. Although included in the preferred embodiment, the pressure sensor 170, the air pressure regulator 282, and automatic control of the air operation 304 by the controller 52 (as shown in FIG. 10) are optional.

Referring back to FIG. 5, the injectate exits the pump 160 via a high pressure line 164 which leads to a high pressure, injection burst control valve 166, also located in the top portion 130 of the device 30. The injection burst control valve 166 may be a high-pressure solenoid valve or any high pressure valve known to those skilled in the art. Optionally, a temperature sensor 168 can be located within the line 162 or line 164 to measure the temperature of the mixed injectate. During operation, like temperature sensor 147 located within the water reservoir 144, if the temperature is above the preprogrammed or predetermined value required for a given injection run/subject, the injection burst control valve 166 will not open.

Figure 6:
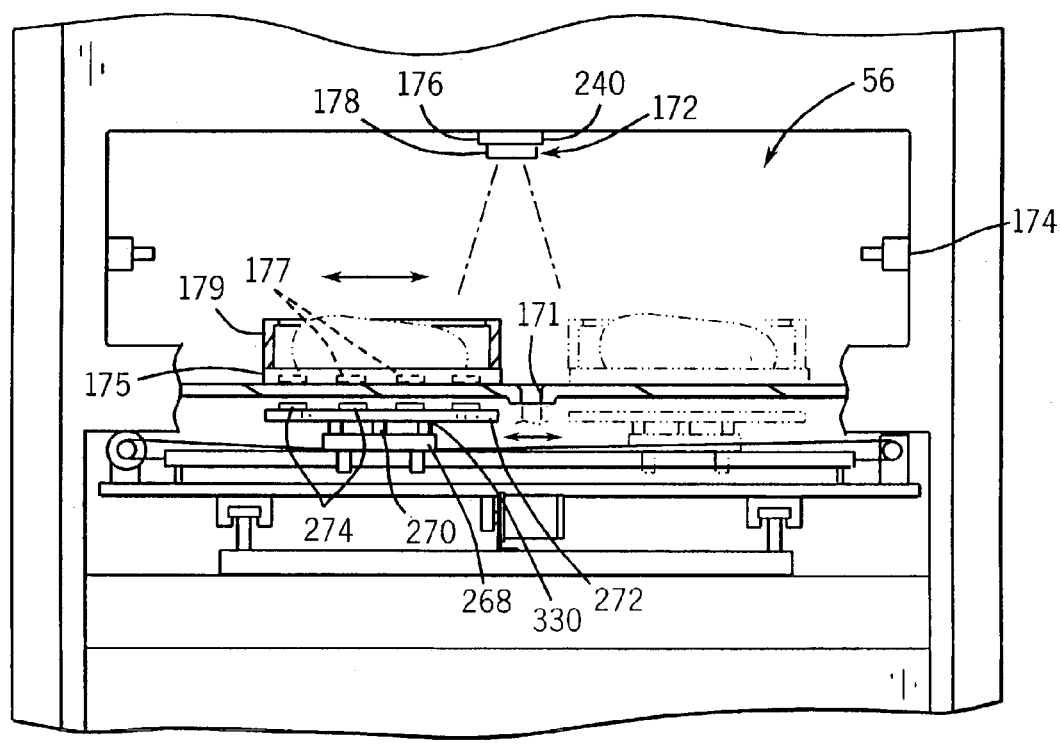
FIG. 6 an elevation view of the injection device shown in FIGS. 1 through 5, showing a partial view front side thereof.

Referring next to FIG. 6, the front side 34 of the device 30 is shown. The injection chamber 56 contains an injection head 172 which receives the high pressure liquid injectate exiting the injection burst control valve 166. While only one injection head 172 is illustrated in FIG. 6, it will be appreciated by those skilled in the art that the injectate flow exiting the injection burst control valve 166 may be divided among two or more injection heads 172, depending on the particular application of the invention.

The injection chamber 56 also includes cleaning nozzles 174 which are removably and sealably mounted within the injection chamber 56 for rinsing and cleaning the injection chamber 56. During a cleaning cycle, the cleaning valve 145 will be opened supplying water from the water line 143 to the cleaning nozzles 174. The injection chamber 56 includes a drain opening 171 and a drain line 173 (shown in FIG. 5) for draining excess injectate from the injection chamber 56 and out of the device 30 through the drain exit port 124. Optionally, the device 30 includes a drain pump housed within the device 30 which is operated periodically by the controller 52 to avoid excess build-up in the injection chamber 56.

A shuttle 175 and a carrier tray 179 are provided for moving the injection subject with respect to the injection head 172 during an injection run. The shuttle 175 is a substantially rectangular plate containing apertures (not shown), for draining excess liquid injectate. The shuttle 175 includes a plurality of magnets 177 affixed thereto for moving the shuttle 175 within the injection chamber 56 without locating mechanical or electrical components within the injection chamber, as will be described.

The carrier tray 179 is removably coupled to the shuttle and rides on the shuttle 175 during an injection run. The tray 179 can be coupled to the shuttle 175 in several different positions in order to vary the height of the injection subject with respect to the injection head 172. The shuttle 175 and the tray 179 are located within the injection chamber 56 and are removable therefrom for cleaning.

The shuttle 175 and the tray 179 can be of any size or shape, depending on the desired injection effect or on the type of food subject the shuttle 175 and the tray 179 are designed to carry. For example, in order to bring a food subject closer to the injection head 172, the shuttle 175, or the tray 179 can be greater in height than indicated in FIG. 6 to provide a platform for the food subject. Accordingly, it is contemplated that multiple shuttles 175 and multiple carrier trays 179 may be provided with the device 30, for different food-subject applications of the invention.

Figure 7:
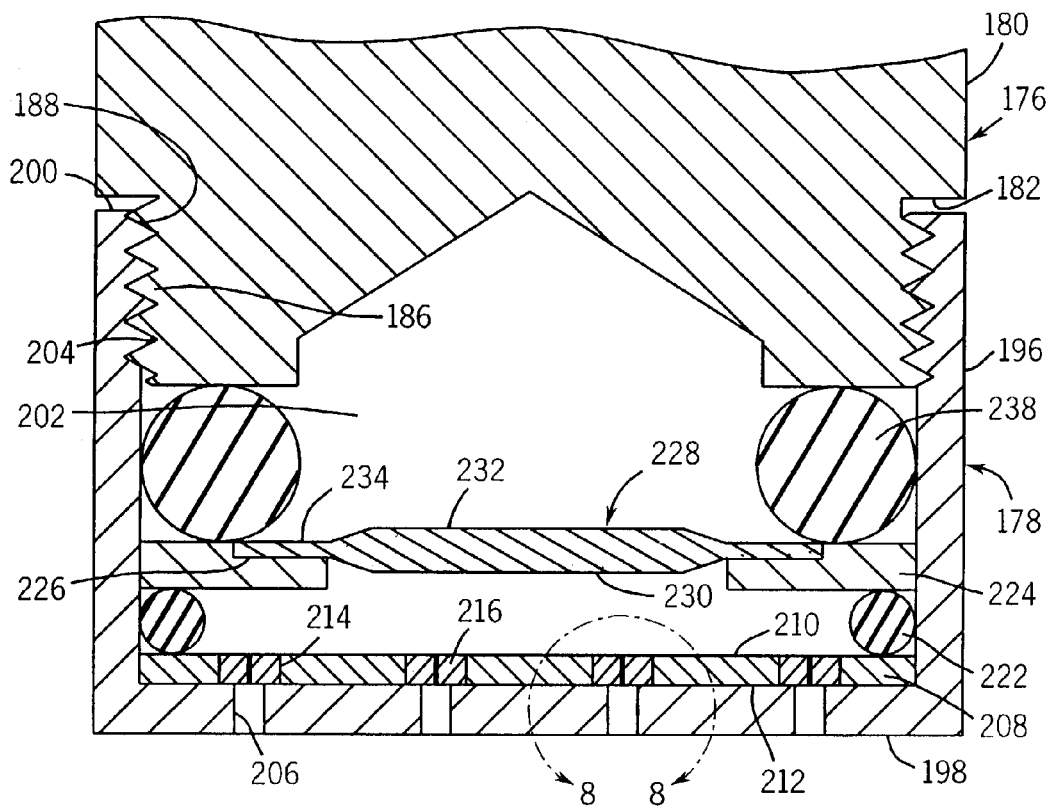
FIG. 7 is a detailed view of an injection head of the injection device shown in FIGS. 1 through 6.
Figure 8:
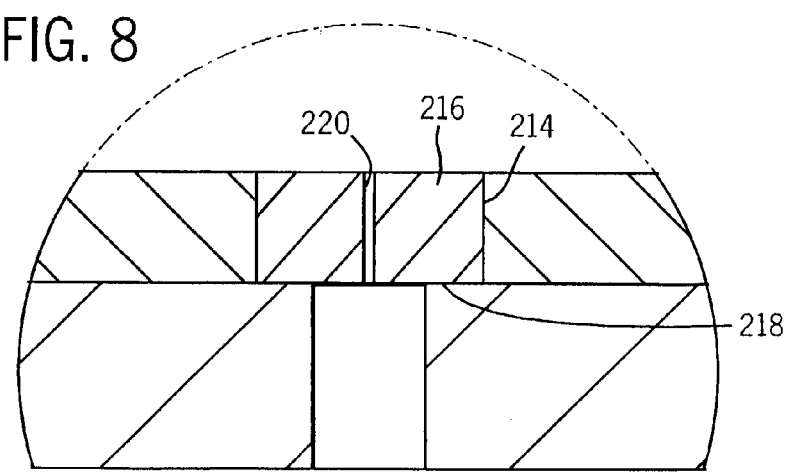
FIG. 8 is a cross-sectional view of an injection head of the injection device shown in FIG. 7 taken along line 8-8.

Referring next to FIGS. 7 and 8, in addition to FIG. 6, a detailed view of the injection head 172 is shown. The injection head 172 is substantially cylindrical in shape and includes a top section 176 and a bottom section 178 which is removably connected to the top section 176. The injection head 172 and all related components are preferably constructed of stainless steel; however, the injection head 172 may be constructed of any material known to those skilled in the art capable of withstanding the high system pressures required to needlelessly inject subjects.

The top section 176 of the injection head 172 has a cylindrical, outer surface indicated generally at 180, a bottom surface indicated generally at 182, and a top surface indicated generally at 184 (shown in FIG. 5). A portion 186 of the outer surface 180 of the top section 176 contains threads 188 for removably threading the top section 176 on to the bottom section 178 of the injection head 172.

Referring to FIG. 5, in addition to FIG. 7, the inside portion of the top surface 184 of the top section 176 is concave, or dome-shape, and includes a fluid-in port 190 which receives the high pressure injectate exiting the injection burst control valve 166. The top surface 184 also includes an air release port 192, located at the highest point along the top surface 184 of the top section 176, for releasing any trapped air within the injection head 172.

A fast-acting, solenoid escape valve 194 is connected to the air release port 192 for releasing any air trapped in the system. The outlet of the escape valve 194 is connected to a drain line 195 for directing any entrained injectate out of the device 30 through the drain port 124. The drain line 195, carrying excess injectate flowing out the air release port 192, can be in fluid communication with the drain line 173 before exiting the device 30 through the drain port 124.

Turning back to FIGS. 7 and 8, the bottom section 178 of the injection head 172 contains a cylindrical, outer surface indicated generally at 196, a bottom surface indicated generally 198, and a top surface indicated generally at 200. The bottom surface 198 of the bottom section 178 contains a plurality of apertures 206 through which liquid injectate can exit the injection head 172. The bottom section 178 contains a cavity 202 including threads 204 located near the top surface 200 of the bottom section 178 for removably coupling the bottom section 178 to the top section 176. The bottom section 178 may alternatively be removably connected to the top section 176 in any manner known to those skilled in the art.

A nozzle disc 208, having a top side 210 and a bottom side 212, is removably located within the cavity 202 of the bottom section 178 of the injection head 172. The nozzle disc 208 is keyed so that it fits within the cavity 202 in only one direction, making assembly of the injection head 172 easier. The nozzle disc 208 contains a plurality of openings 214 for accommodating a plurality of injection nozzles 216. Each opening 214 in the nozzle disc 208 contains a lip 218 located near the bottom surface 212 in order to removably retain the injection nozzles 216 within the openings 214 of the nozzle disc 208. When installed for an injection run, the openings 214 in the nozzle disc 208 are aligned with the apertures 206 located within the bottom surface 198 of the bottom section 178 of the injection head 172. The nozzle disc 208 is removable from the injection head 172, and the nozzles 216 are removable from the nozzle disc 208 for cleaning of the entire injection head assembly.

Each injection nozzle 216 has an orifice 220 for delivery of the liquid injectate to the injection subject. The orifice 220 in each in injection nozzle is preferably less than 0.025 inches and more preferably approximately 0.006 inches. Consistent with the teachings of the present invention, it will be apparent to one skilled in the art that the orifice 220 in the injection nozzles 196 may be greater than 0.025 inches or less than 0.006 inches depending on the type or thickness of the subject to be injected. Accordingly, the orifice 220 of each nozzle 216 may be of any size that permits delivery of injection bursts at a pressure sufficient to uniformly and needlelessly inject the food subject with injectate without damaging or deforming the food subject.

The nozzles 216 are constructed of sapphire, or any material known to those skilled in the art capable of withstanding the high-pressure fluid bursts required for the needleless injection of subjects. Further, nozzles 216 can be easily changed depending on the subject to be injected and the desired injection objectives. While the nozzles 216 are shown removably placed within the nozzle disc 208 of the injection head 172, the nozzles 216 may instead be integral with the nozzle disc 208, or integral within the bottom surface 198 of the bottom section 178 of the injection head 172. Further, the nozzles 216 may be removably attached to the injection head 172 in any manner known to those skilled in the art.

In addition, while sixteen nozzles 216 are illustrated, more or less nozzles may be used depending on the desired injection effect and type of food subject. For example, for larger or thicker injection subjects twenty-four nozzles 216 may be used in conjunction with a nozzle disc having a corresponding number of openings. Also, while a rectangular injection pattern is illustrated, it is contemplated that the injection nozzles 216 can be arranged in a circular pattern or in any other configuration, depending on the desired injection effect to be achieved.

To assemble the injection head 172 in preparation for an injection run, the nozzles 216 are placed within the openings 214 in the nozzle disc 208 and the nozzle disc 208 is placed bottom side 212 down into the bottom section 178 of the injection head 172. An O-ring 222 and a washer 224 are placed into the bottom section 178 of the injection head 172 after the nozzle disc 208 and nozzles 216 are in position. When the top section 176 is coupled to the bottom section 178, the O-ring 222 and the washer 224 prevent the injectate from flowing around the nozzle disc 208. The washer 224 is provided with a small groove 226.

A disk filter 228 is positioned within the bottom section 178 of the injection head 172 over the O-ring 222 and the washer 224. The filter 228 is generally a disk-shaped element having a front side 230, a back side 232, a flat peripheral edge 234, and a plurality of apertures (not shown) formed within the filter 228. The peripheral edge 234 engages the small groove 226 in the washer 224 when the filter 234 is properly positioned within the bottom section 178 of the injection head 172. During operation, injectate passes through the apertures of the filter 228 to remove particulate in the liquid injectate before entering the nozzles 216.

After the filter 228 is installed in the bottom section 178 of the injection head 172, a second O-ring 238 is positioned in bottom section 178 of the injection head 172 over the filter 228 SO that the O-ring 238 engages the peripheral edge 234 on the top side 234 of the filter 228. After the O-ring 238 is installed, the bottom section 178 is threaded onto and hand tightened on the top section 176 of the injection head 172. Accordingly, during an injection run, the incoming injectate does not contact any of the threading, grooves, or pitting that may be present in either the top section 176 or the bottom section 178.

Further, because residual injectate does not become trapped within the threaded connection or pass through it, the risk for fluid contamination is decreased. In addition, the configuration of the injection head 172 may increase the useful life of the injection head 172, as thread or grooves exposed to acidic conditions (cleaning fluid or injectate) tend to pit easily or rust.

The O-rings 222, 238 can be constructed of a material such as those sold under the trademark TEFLON by DuPont, Inc. or its licensees, EPDM (Ethylene Propylene Diene Monomer), silicone, rubber, or any other material known to those skilled in the art for sealing the internal components of the injection head 172 in place as well as sealing the bottom section 178 on to the top section 176 of the injection head 172. It will at once be appreciated by those skilled in the art that the top section 176 and the bottom section 178 of the injection head 172 can be removably sealed together by any means known to those skilled in the art.

Referring for the moment back to FIGS. 5 and 6, the top section 176 of the injection head 172 is mounted to the device 30 such that the top surface 184 of the top section 176 extends into or faces the top portion 130 of the device 30. The bottom surface 182 of the top section 176 extends into the injection chamber 56. Accordingly, the bottom section 178 of the injection head 172 is removably attached to the top section 176 from within the injection chamber 56.

The top section 176 is completely sealed around the external perimeter of its outer surface 180 at the intersection of the top section 176 and the injection chamber 56 to prevent liquid injectate from spraying or otherwise entering the top portion 130 of the device 30. The top section 176 is sealed in place by a sealing mechanism 240 which can include machine screws, and/or an O-ring or any mechanical sealing device known in the art which can seal the injection chamber 56 around the perimeter of the top section 176. In this way, the injection head 172 is stationary during an injection run. However, in this arrangement, the top section 176 can be removed from the device 30 for maintenance purposes, or to change the size or type of injection head.

The top section 176 of the injection head 172 can be removably sealed into place in any manner known to those skilled in the art. In alternate embodiments, the injection head 172 may be removably sealed in such a manner that permits the injection head to be adjustable in height within the injection chamber 56. In yet other embodiments, the top section 176 of the injection head 172 can be permanently welded or otherwise adhered to the device 30.

It will appreciated by those skilled in the art that the injection head 172 may be of any shape or size, provided that adequate fluid pressure can be achieved at the outlet of the nozzles 216 to provide for the needleless injection of the food subject. For example, the injection head 140, rather than being cylindrical in shape, can be round or generally tubular in shape having apertures and bearing nozzles within any surface of the injection head.

Figure 9:
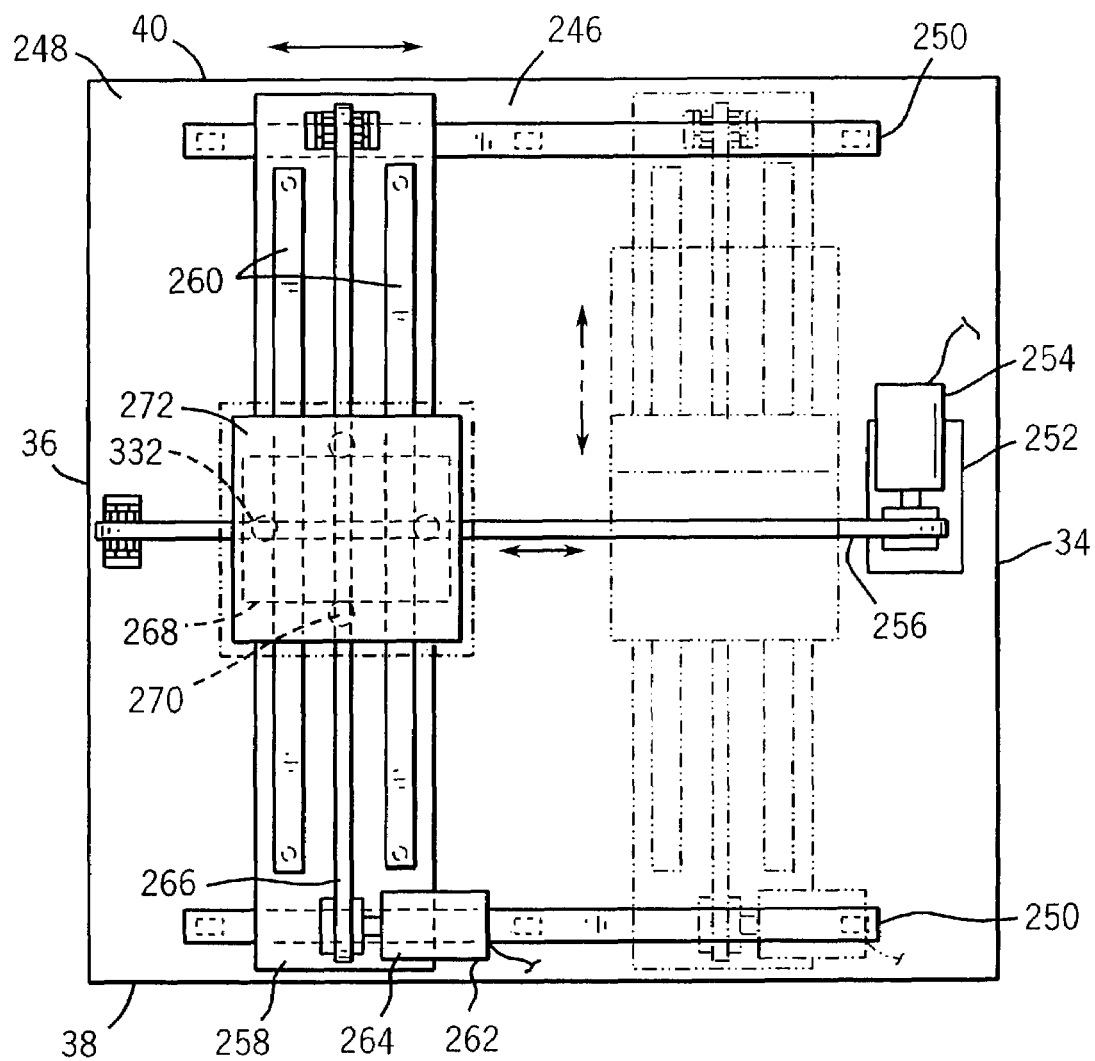
FIG. 9 is a top plan view of an x-y drive system of the injection device shown in FIGS. 1 through 8.

Referring next to FIG. 9, in addition to FIG. 6, an x-y drive system 246 is illustrated. The x-y drive system 246 is located underneath the injection chamber 56 and can be accessed through any of the maintenance openings in any of the sides of the machine 34, 36, 38, 40. The x-y drive system 246 moves the shuttle 175 within the injection chamber 56 from underneath the injection chamber 56, eliminating the need for moving parts within the injection chamber 56. The x-y drive system 246 contains a table 248, and two parallel tracks 250 that are mounted to the table 248 on the left and right sides 38, 40 of the device 30 respectively, and which extend from the front side 34 to the back side 36 of the device 30. A first drive system 252, including a motor 254 and a drive belt 256, is also mounted to the table 248.

An x-y platform 258 is movably mounted to the parallel tracks 250, extending from the left side 38 to the right side 40 of the device 30. Two parallel tracks 260 which extend from the left side 38 to the right side 40 of the device 30 are mounted to the x-y platform 258. A second drive system 262, including a motor 264 and a drive belt 266, is also mounted to the x-y platform 258. An x-y drive plate 268 (best shown in FIG. 6) is movably mounted to the parallel tracks 260.

Support columns 270 are generally cylindrical in shape, having one end with a smaller circumference than the other, such that the transition between the large circumferential portion and the smaller circumferential portion forms a shoulder 330. The large circumferential portions of each support column 270 are mounted to the x-y drive plate 268. A plate 272 having apertures 332 on one of two opposing sides is carried by the support columns 270 such each aperture 332 within the plate 272 slidably receives the smaller circumferential portion of each support column 270, respectively, and such that the plate may rest on the shoulders 330 of the support columns 270. A plurality of magnets 274 are affixed to the plate 272, and are arranged on the plate 272 in substantially the same configuration as the magnets 177 on the shuttle 175 located within the injection chamber 56.

By virtue of the magnetic attraction between the magnets 274 on the plate 272 and the magnets 177 on the shuttle 175, the plate 272 vertically slides along the support columns 270 between the shoulders 330 and the end of the support columns 270 in a manner that allows the plate 272 to account for the slope in the bottom of the injection chamber 56, irregularities in the bottom of the injection chamber 56, and/or allows the plate 272 to account for misalignments between the x-y drive system 246 and the bottom of the injection chamber 56 when the x-y drive system 246 is operating.

During an injection run, the first drive system 252 moves the x-y platform 254, and in turn moves the plate 272 with magnets 274 affixed thereto, to any position located from the front side 34 of the device 30 to the back side 36 of the device 30 in accordance with a particular preprogrammed injection pattern, or in accordance with a predetermined injection effect to be achieved. Simultaneously, the second drive system 262 moves the x-y drive plate 268, which in turn moves the plate 272 with magnets 274 affixed thereto, to any position located from the left side 38 of the device 30 to the right side 40 of the device 30 in accordance with a particular preprogrammed injection pattern, or in accordance with a predetermined injection effect to be achieved. Accordingly, the plate 272 can be moved in any direction, and to any x-y position within the device 30.

Thus, during an injection run, the magnets 177 on the shuttle 175 within the injection chamber 56 are aligned to match up with the magnets 274 that are affixed to the plate 272. The plate 272, by means of magnetic attraction, will then drive the shuttle 175 to any location within the injection chamber.

It will be appreciated that any drive or positioning mechanism known to those skilled in the art can be used to move the injection subject within the injection chamber 56. This includes not only any linear positioning system such as a servo motor-lead screw type drive, but also, any rotary or nonlinear automated positioning system known to those skilled in the art.

Turning back to FIGS. 1 and 2, an equipment compartment 276 located within a bottom portion of the device 30 is illustrated. The equipment compartment 276 is included within the device 30 for locating any required electrical and mechanical equipment within the device 30. The equipment compartment 276 extends from the front side 34 to the back side 36, and from the right side 40 to left side 38 along the bottom 44 of the device 30.

An air compressor 278, a compressed air tank 280, and the air pressure regulator 282 are mounted within the equipment compartment 276 for supplying compressed air to the pump 160 and to any compressed air driven equipment required for the device 30. In alternate embodiments, the device 30 may not be supplied with an internal air compressor 278. In these embodiments, an external compressed air source is used to supply the requisite compressed air to the device 30, and is connected to the device 30 via an input port formed in the back side 36 of the device 30, which in turn is connected directly to the compressed air tank 280.

A compressor 286 for use with the air conditioning system 126, and the controller 52 are also located within the equipment compartment 276. In addition, any other equipment necessary for operation of the device 30 may be included within the equipment compartment 276. Further, any equipment housed within the top portion 130 of the device 30, such as the air pump 160, the water reservoir 144, valves 146, 148, 154, 166, or 194, and any associated piping, may be optionally located within the equipment compartment 276, depending on the dimensions and space requirements of the device 30. Likewise, any equipment housed within the equipment compartment 276 can alternatively be located within the top portion 130 of the device, 30 or any other location within the device 30, depending on the dimensions and space requirements of the device 30.

Finally, while the device 30, as shown, is generally a rectangular housing, it will be at once appreciated by those skilled in the art that the device 30 may be of any size, shape, or dimensions required to accommodate the device 30 in an institutional setting. Accordingly, consistent with the broader aspects of the invention, the device 30 may be custom-sized to fit into an existing space at any intended location.

It can be seen that the present invention includes a method of using substantially uniform, high-pressure injection bursts to instantly and needlelessly inject a food subject with injectate fluid. In this way, damage to the external surfaces of the subject is minimized. The present invention also includes a method of instantly delivering injection fluid to a subject using substantially uniform, high-pressure injection bursts of a sufficient pressure to needlelessly add flavors, colors, preservatives, binders, herbal extracts, vitamins, minerals, anti-microbial solutions and/or tenderizers to an injection subject without significant damage to the external surfaces of the injection subject.

Accordingly, referring to FIGS. 1 through 11, operation of the needleless injection device 30 of the present invention will now be described. First, an operator will attach an external water supply line to the water input port 123, an electrical power line to the electrical input port, and a compressed air line (if there is no internal air compressor 278) to the back side 36 of the device 30. A drain line is connected to the drain port 124.

The injectate pouches (containing the liquid injectate) are loaded into the device 30, and connected to the quick connect fittings 140 in each of the trays 132. Preferably, the injectate pouches 134 are refrigerated to the proper temperature before being loaded into the device 30. In addition, whenever the device 30 is plugged in, the air conditioning system 126 will be running, maintaining the top portion 130 of the device 30, and any injectate pouches 134 stored therein, at the proper temperature. In this way, even when not performing an injection run, the device 30 can remain plugged in to store the liquid injectate at the proper temperature between runs.

To initiate an injection run, the operator turns on the device 30 using the button 48 located on the control panel 47. The operator then follows the prompts indicated on the touch screen 50 and enters injection run process parameters for controlling the device. Such parameters include but are not limited to the food type, the thickness of the food, the desired injectate pouch(es) (or tray number(s) in which it is located), the batch size, the injection pressure, duration of the injection bursts, spacing between injection bursts, timing of the injections, the output pressure of the air pump 160, the movement of the shuttle 175, or any other information necessary for a given injection run. These parameters may be adjusted during the production run in accordance with the required injection effect to be achieved by the machine.

Alternately, the operator can use the touch screen 50 to retrieve from the controller 52 a stored set of process variables for a given injection subject or for a given injection effect. The preprogrammed process variables can include control of the injection pressure, duration of the injection bursts, spacing between injection bursts, timing of the injections, the output pressure of the air pump 160, the movement of the shuttle 175, or any other information necessary to inject a given type of subject.

As part of a fluid operation 300, the controller 52 may be programmed to automatically replenish the water reservoir 144 during an injection run via the water replenishment valve 148 when the water level drops below a predetermined level as indicated by level sensor 146 (as illustrated in FIG. 10). Accordingly, no operator intervention will be required to maintain a high level of water within the water reservoir 144. Alternatively, if the water reservoir 144 becomes low, the touch screen 50 may indicate to the operator that the level is low and will permit the operator to refresh the injectate fluid automatically using the controller 52. In addition, the operator can pause the operation of the device 30 and manually refill the water reservoir 144.

The operator places the injection shuttle 175 within the injection chamber 56 so that the magnets 177 affixed thereto are aligned with the magnets 274 affixed to the plate 272 on the x-y drive system 246. The carrier tray 179 is then placed on to the shuttle 175 in the position required for achieving the desired injection effect on the subject, and the injection subject is then placed on the carrier tray 179.

In order to begin an injection run, the doors 58 on the injection chamber 56 are closed. As part of a safety door operation 302 of the device 30, the doors 58 on the injection chamber 56 contain a sensor 284 which is interlocked with the controller 52. The controller will not permit an injection run to be initiated if the doors 58 are open.

During operation, liquid injectate from one or more of the selected injectate pouches 134 will flow through the openings 138 in each of the selected trays 132 to the injectate control valves 154, respectively. The injectate control valves 154 then open to permit injectate to flow to the mixing manifold 158 via line 156. If desired, water from the water reservoir 144 will also flow to the mixing manifold to dilute the injectate.

Also part of the fluid operation 300 of the device 30, the temperature sensor 147 relays the water temperature to the controller 52. If the water temperature is higher than a predetermined operational temperature, a temperature warning light will appear on the touch screen 50 and the controller 52 will prevent the injection burst control valve 166 from opening. If this occurs, the operator must wait until the air conditioning system 126 cools the water to the proper temperature, and the warning light disappears. In addition, and to speed cooling, crushed ice can be added to the water reservoir 144. If the warning light appears during an injection run, the running program will be allowed to finish; however no further cycles can be initiated until the water supply is cooled to the proper temperature, and the warning light disappears.

Control and timing of the injectate control valves 154 and the water control valve 146 will influence the final composition of the liquid to be injected into the food stuff. Therefore, as part of the fluid operation 300 of the device 30, the control and timing of the injectate control valves 154 and the water control valve 150 are controlled by the controller 52 in order to achieve a predetermined injectate composition.

It will be appreciated by those skilled in the art that a given food subject may require more than one injection burst for a given run. Therefore, the composition of the "mixed injectate" can be changed by changing the timing and control of the injectate control valves 154 from injection burst to injection burst, or during and injection burst, depending on the desired injection effect to be achieved.

The mixed injectate exits the mixing manifold 158 via the pump feed line 162 and flows to the low-pressure side of the injection pump 160, also within the top portion 130 of the device 30. The air pump 160 pumps the injectate to the injection burst control valve 166 via high pressure line 164.

As part of an air operation 304 of the device 30, the output pressure of the fluid is relayed from the pressure sensor 170 to the controller 52, as illustrated in FIG. 10. If the required injection pressure has not been attained, the controller 52 automatically responds by adjusting the air pressure regulator 282 to change the air pressure flow to the pump 160 until the output pressure of the pump has reached the required or preprogrammed injection pressure. In alternate embodiments, the operator may be permitted to manually adjust the air flow to the pump 160 via the touch screen 50. Although automatic control of the air operation 304 is included in the preferred embodiment, automatic control is optional.

Figure 11:
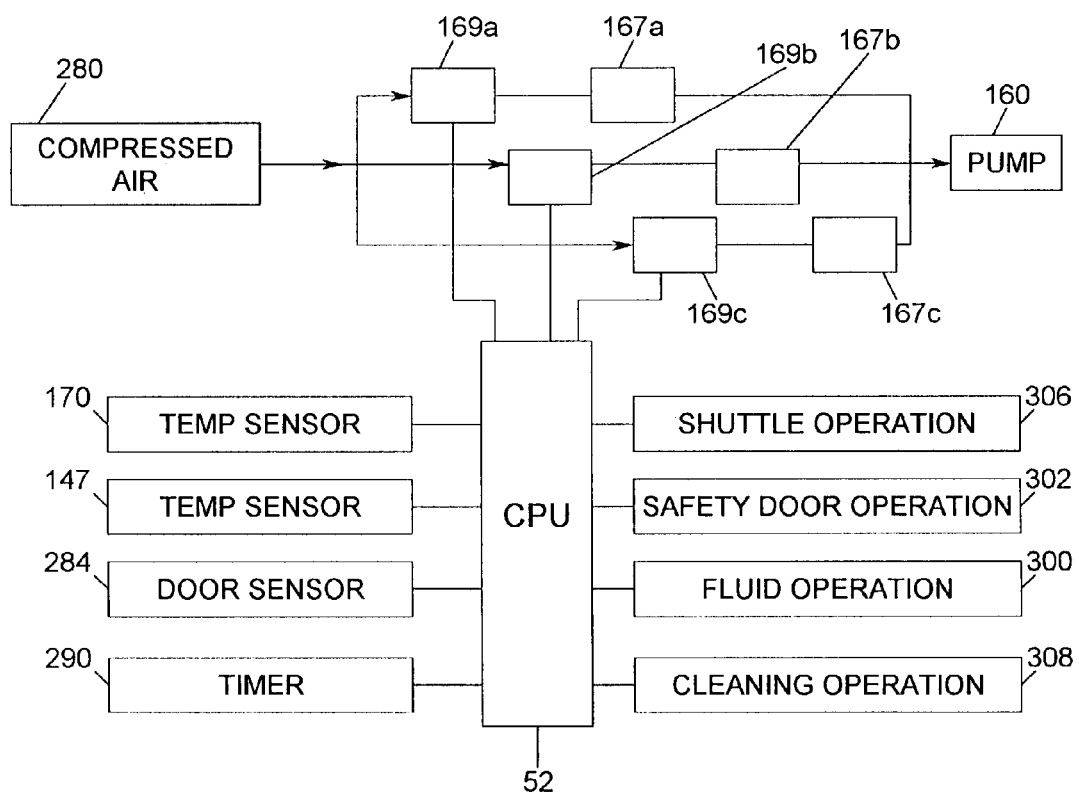
FIG. 11 is a control schematic of the injection device shown in FIGS. 1 through 8, showing a series of preset regulators and valves.

An alternative to automatic control of the air operation is illustrated in FIG. 11. A series of preset regulators 167a, 167b, 167c and valves 169a, 169b, 169c are used to regulate air flow from a compressed air tank 280 to the pump 160, thereby changing the output pressure of the pump 160 between three predetermined injection pressures. When the type or thickness of the food subject is entered by the operator using the touch screen 50, the controller 52 responsively activates the corresponding valve 169a, 169b, or 169c which directs flow of compressed air to the associated regulator 167a, 167b, 167c, allowing a predetermined flow rate of air to feed the pump 160. This causes the pump 160 to deliver injectate at the predetermined output pressure corresponding to the particular activated valve. While three preset pressure regulators 167a, 167b, 167c and valves 169a, 169b, 169c are illustrated in FIG. 11, any number of preset regulators and valves corresponding to any number of predetermined output pressures of the pump 160 may be used.

Optionally, the temperature sensor 168 relays the injectate temperature to the controller 52. If the temperature is too high, a temperature warning light will appear on the touch screen 50 and the controller 52 will prevent the injection burst control valve 166 from opening. If this occurs, the operator must wait until the air conditioning system 126 cools the injectate to the proper temperature, and the warning light disappears. If the warning light appears during a run, the running program will be allowed to finish; however no further cycles can be started until the injectate is cooled to the proper temperature, and the warning light disappears.

When the injectate is at proper temperature, the injection control valve 166 opens to direct injectate to flow to the injection head 172. The injection bursts then occur in conjunction with the preprogrammed or previously entered process parameters and are completely synchronized with the movement of the x-y drive system 246 as part of a shuttle operation 306.

Accordingly, the injection subject (located on the carrier tray 179) is moved with respect to the injection head 172 and is injected according to the desired results. The shuttle 175 and carrier tray 179, and in turn the injection subject, can be moved during an injection burst, or can be moved in between injection bursts depending on the desired injection effect. Thus, when the subject is in place, the injection burst control valve 166 opens allowing fluid to be delivered to the subject through the nozzles 216 on the injection head 172. After an injection burst is complete, the injection burst control valve 166 is closed. An injection subject can receive as many injection bursts as necessary to achieve the desired results.

Periodically during an injection run, the fast-acting solenoid valve 194 connected to the air release port 192 is opened to relieve any air build-up within the injection head 172. If the valve 194 is not preprogrammed to open at a given interval, the operator can use the touch screen 50 to cause the valve 194 to open periodically. Any injectate that exits the air release port 192 will flow via the drain line 195 out of the device 30 through the drain port 124.

Excess injectate flows in the injection chamber 56 flows through the drain opening 171 and out of the device 30 through the drain port 124. If a drain pump is provided, the controller 52 will automatically turn the pump on and off to avoid excess injectate build-up in the injection chamber 56.

After all injection bursts for a given subject have been delivered, the operator may then open the doors 58 on the injection chamber 56 and remove the injected food subject. Complete and uniform injection of a food subject with a liquid injectate in the manner described herein, occurs in a manner of seconds, depending on the type injection subject. The instantaneous nature of an injection run of the present invention renders the device useful in restaurants or cafes where the timing of food delivery is critical.

As part of a cleaning operation 308, in between each injection run, the injection head 172, injection nozzles 216, and associated valves and lines may be rinsed with water from the water reservoir 144. The injection chamber 56 is rinsed with water diverted from the water line 153 using the cleaning nozzles 174. However, after a specified number of hours of operation set by a timer 290, the touch screen 50 will automatically prompt the operator to run a cleaning cycle. Preferably, the specified time period is four hours.

In addition, in between injection runs, and prior to shutting down the machine, the touch screen will include a control, e.g. a switch or a button, for initiating a cleaning cycle. The operator will then follow the prompts indicated to clean and sanitize the device. If a cleaning cycle is not run before the device 30 is shut down, a cleaning cycle control will be indicated on the touch screen 50 when the device 30 is restarted.

During a cleaning cycle, the operator is prompted to use the touch screen 50 to open the cleaning valve 145 in order to divert the water supply entering the water reservoir 144 to the cleaning nozzles 174. Optionally, cleaning solution is supplied to the device 30 through the water input port 123 along with the external water supply. However, the cleaning solution can be supplied to the water input port 123 in any manner known to those skilled in the art. The doors 58 of the injection chamber 56 are then closed and sealed, and the cleaning cycle is started by the operator via the touch screen 50. When the cleaning cycle is completed, the doors 58 of the injection chamber 56 are opened, and additional injection runs can occur.

In addition, the cleaning operation can include removing the injection head 172, and disassembling it for manual cleaning of the filter, O-rings, the washer, the nozzle disc, and the nozzles.

It may therefore be seen that the present invention teaches a needleless injection device and method for needlelessly injecting a food subject in which one or more types of liquid food additive are individually and/or simultaneously delivered to a food subject within a sealed injection chamber or compartment, with complete and uniform injection of the food subject occurring in a matter of seconds. The needleless injection device and method of the present invention minimizes contamination by totally enclosing the injection process within a sealed chamber, and by eliminating the need for the injection nozzles to contact, or be placed immediately adjacent to the food subject.

It may further be seen that the present invention teaches a needleless injection device and method for injecting a food subject that is efficient and compact for use in operational areas where conveyor systems, or large production equipment are unnecessary, or too expensive. Further, the present invention provides a method for uniquely flavoring or otherwise enhancing a food subject in a stand-alone device that can be rinsed or cleaned between each food subject. The present invention permits a new/different food subject, or a new/different flavor combination to be injected for sequential injection runs, without requiring "shut-down" of an entire production line, or an entire restaurant operation.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A totally enclosed injection device comprising:
    a sealed injection chamber;
    a manifold head including an inlet portion and a discharge portion, said discharge portion removably sealed within said injection chamber;
    at least one liquid source in fluid communication with said inlet portion of said manifold head;
    a carrier component movably disposed within said injection chamber and spaced apart from said discharge portion of said manifold head; and
    a x-y drive mechanism, external to said sealed 2 injection chamber, magnetically coupled to said carrier component for movement of said carrier component within said injection chamber relative to said discharge portion of said manifold head.

2. A device as defined in claim 1, wherein said injection chamber further comprises at least one cleaning nozzle.

3. A device as defined in claim 1, wherein said manifold head further comprises an escape aperture and at least one valve in fluid communication with said escape aperture of said injection head.

4. A device as defined in claim 1, wherein said discharge portion of said manifold head comprises at least one nozzle having an orifice.

5. A device as defined in claim 1, wherein said manifold head is stationary with respect to said carrier component.

6. A device as defined in claim 1, further comprising a refrigeration component for retaining said liquid source at a predetermined temperature.

7. A device as defined in claim 1, further comprising a pump having a low pressure inlet in fluid communication with each of said liquid sources and a high pressure outlet in fluid communication with said inlet portion of said manifold head.

8. A device as defined in claim 1, further comprising a control system including a controller and a touch screen.

9. A compact, totally-enclosed device for injecting a food subject with liquid comprising:
    an injection compartment;

a stationary injection component comprising an inlet and a plurality of discharge orifices extending into said injection compartment;

a carrier element spaced apart from each of said discharge orifices of said injection component for supporting the food subject, said carrier element being movable within said injection compartment with respect to said discharge orifices, wherein the food subject is spaced apart from each of said discharge orifices during operation of the device; and an x-y drive component located exterior to said injection compartment, said x-y drive component magnetically coupled to said carrier element.

10. A device as defined in claim 9, wherein said manifold head further comprises an escape aperture and at least one valve in fluid communication with said escape aperture of said injection head.

11. A device as defined in claim 9, wherein said injection component further comprises a filter assembly having a liquid inlet, a liquid outlet, and a liquid passage way connecting said liquid inlet and said liquid outlet, said filter assembly in encasement with said inlet of said injection component.

12. A device as defined in claim 9, further comprising a plurality of liquid sources in fluid communication with said inlet of said injection component.

13. A device as defined in claim 9, further comprising a pump having a low pressure inlet in fluid communication with said liquid source and a high pressure outlet in fluid communication with said inlet of said injection component.

14. A totally enclosed, compact injection device comprising:

a plurality of containers for retaining liquid;

a mixing manifold having an inlet in fluid communication with each of said containers and an outlet;

a pump having a low pressure inlet in fluid communication with said outlet of said mixing manifold and a high pressure outlet;

an injection head comprising an inlet in fluid communication with said outlet of said pump, and a discharge portion including a plurality of nozzles;

a sealed injection chamber, wherein said injection chamber sealably encloses said discharge portion of said injection head such that said discharge portion and each of said nozzles extend into said injection chamber;

a shuttle component movably positioned within said injection chamber having a first surface facing towards said discharge portion of said injection head for carrying an injection subject and a second surface facing away from said discharge portion;

an x-y drive mechanism exterior to injection chamber, said x-y drive mechanism magnetically coupled to said second surface of said shuttle component for orthogonally driving said shuttle component within said injection chamber with respect to said injection head; and a cooling mechanism exterior to said injection chamber for retaining liquid in said containers within a predetermined temperature range.

\* \* \* \* \*